United States Patent [19]
Basch et al.

[11] Patent Number: 5,616,641
[45] Date of Patent: Apr. 1, 1997

[54] SEPARATION OF PLASTIC COMPONENTS FOR RECYCLING THEREOF

[75] Inventors: Jeffrey D. Basch, Evansville; Robert R. Gallucci; Douglas G. Hamilton, both of Mt. Vernon, all of Ind.

[73] Assignee: General Electric Company, Pittsfield, Mass.

[21] Appl. No.: 653,984

[22] Filed: May 28, 1996

Related U.S. Application Data

[63] Continuation of Ser. No. 346,043, Nov. 29, 1994, abandoned.

[51] Int. Cl.[6] ................................................ C08K 3/32
[52] U.S. Cl. ............................................. 524/417; 521/41
[58] Field of Search ............................... 521/40; 524/417

[56] References Cited

U.S. PATENT DOCUMENTS

| | | | |
|---|---|---|---|
| 4,532,290 | 7/1985 | Jaquiss et al. | 524/417 |
| 4,904,516 | 2/1990 | Creamer | 528/129 |

*Primary Examiner*—Kriellion S. Morgan

[57] ABSTRACT

An improved floatation separation process wherein the improvement comprises dissolving in a floatation bath sufficient alkali metal salt or alkaline earth metal salt of a phosphate, a pyrophosphate, a metaphosphate or a polyphosphate to provide a concentration greater than 1.0 grams per cubic centimeter and generally about 1.05 to about 1.6. g/cc. A particular salt is sodium dihydrogen phosphate. Preferably, the floatation process is employed to separate physical mixtures of plastic parts.

20 Claims, No Drawings

SEPARATION OF PLASTIC COMPONENTS FOR RECYCLING THEREOF

This is a continuation of application Ser. No. 08/346,043 filed on Nov. 29, 1994, now abandoned.

BACKGROUND OF THE INVENTION

This invention is directed to an improved floatation bath process for separating certain molded thermoplastic parts from other materials, including other plastic parts. Such other materials being separated may include dirt, glass, metal, different thermoplastics or thermoset plastics. Such molded thermoplastic parts that may be separated from each other or other materials include plastic parts molded from polyethylene terephthalate, polybutylene terephthalate, aromatic polycarbonates, polyvinyl chloride, etc.

Currently, to separate two or more materials with specific gravities above 1.0 by the floatation bath process, the industry generally uses halide salts such as, for example, sodium chloride (NaCl) or calcium chloride ($CaCl_2$) in order to increase the specific gravity of the water medium in the float bath to a specific gravity such that it lies between the specific gravity of the materials being separated. That material having a lighter specific gravity will float to the top of the bath and that material having a specific gravity greater than the specific gravity of the floatation medium will sink to the bottom of the floatation vessel. Thus materials may be separated from each other by the floatation process. However, there are disadvantages with the use of halide salts such as NaCl or $CaCl_2$ in floatation separation baths. For example, with NaCl, the specific gravity of the water solution in the bath can only be increased to about 1.2 grams/cubic centimeter (g/cc). With $CaCl_2$, the specific gravity of the water in the bath can only be increased to about 1.4 g/cc. Also, dissolving $CaCl_2$ in water is an exothermic reaction, thereby making it difficult to control the temperature of the float bath. In addition, with the separation of certain plastics, residual halogen ions from halide salts can attack the polymer chains of some plastics. For example, with a polycarbonate, the carbonate polymer chains can be attacked by halogen ions and thus can affect a decrease in the molecular weight of the polymer. Further, halogen ions can corrode metal, which would reduce the service life of the floatation tanks, as well as extrusion or injection molding equipment when the recycled plastic is melt processed and molded.

SUMMARY OF THE INVENTION

Therefore, this invention is directed to an improved process for the separation of mixtures of materials having different specific gravities and more particularly to the separation of molded thermoplastic resin parts. The improved process employs certain water soluble salts as a concentrative medium in water for the float separation of materials. The salts of this invention are alkali metal or alkaline earth metal salts of phosphates, pyrophosphates, metaphosphates and polyphosphates, hydrates thereof or blends thereof.

DETAILED DESCRIPTION OF THE INVENTION

The improved process of this invention comprises an improved floatation process for the separation of mixtures of materials with different specific gravities and particularly the separation of mixtures of different thermoplastic resins from each other or from other materials. Specifically, the process of this invention employs certain water soluble salts as a concentrative additive in a water floatation separation process. The salts employed herein should preferably be readily soluble in water and can provide a concentration of greater than 1.0 g/cc and preferably from about 1.05 to about 1.6 g/cc. They are non-corrosive to metal surfaces. Because the phosphates are buffers, they allow for tight control of the pH of the water solution over varying concentrations of the phosphate solutions. Preferably, the pH of the salt solution ranges from about 3 to about 12, more particularly about 4 to 9 and most particularly about 4 to 7. The pH may also be a factor of the particular thermoplastics being separated. For example, if one of the materials being separated is a polycarbonate, a pH of the solution in excess of 9 may have a tendency to degrade the polycarbonate. Also, the disposal of waste water containing the salts of this invention is minimized, since some phosphorous containing compounds are already added to water by the waste water treatment industry.

Another advantage with respect to using the instant salt solution for the separation of thermoplastic resin parts is that they are also sometimes used as stabilizers for thermoplastic resins. Therefore, the salts employed in this invention would probably be compatible with the thermoplastic resins being separated.

The salts that can be employed in the practice of this invention as a concentrative additive to water are particular metal salts of phosphates, pyrophosphates, metaphosphates, polyphosphates or hydrates thereof or blends thereof. The phosphates are generally of the formula:

$$M_x^z(H_yPO_4)_n$$

wherein M is a metal selected from the group consisting of alkali metal or alkaline earth metal (Group I or Group II); z is an integer of from 1 to 2; y is from 0 to 2; n is an integer of from 1 to 2; and x is a integer of from 1 to 3; provided, however, that the values of z, y, n and x meet the requirements of the following formula:

$$(3-y)n=xz$$

The pyrophosphates and the polyphosphates that can be employed in the practice of this invention are generally of the following formula:

$$M_x^z(H_yP_nO_{3n+1})$$

wherein M and z have the same meaning set forth above; y is 0 to 7; n is an integer of from 1 to 6 and x is 1 to 8; provided, however, that the values of z, y, n and x meet the requirements of the following formula:

$$xz=(n-y)+2$$

Examples of the salts that can be employed in the practice of this invention are as follows:

Sodium Hexametaphosphate- $(NaPO_3)_6$
Tetra Potassium Pyrophosphate- $K_4P_2O_7$
Potassium Phosphate- $K_3PO_4$
Mono Potassium Phosphate- $KH_2PO_4$
Dipotassium Phosphate- $K_2HPO_4$
Tetra Sodium Pyrophosphate- $Na_4P_2O_7$
Trisodium Phosphate- $Na_3PO_4$
Disodium Phosphate- $Na_2HPO_4$
Mono Sodium Phosphate- $NaH_2PO_4$ The salts employed in this invention after soluble salts. Because of the high densities that can be achieved with these salts, they can be used in solution to obtain densities of greater than 1.0 g/cc and preferably from about 1.05 g/cc to about 1.6 g/cc. In fact, the solubility rate of the salt or the density of the bath may be adjusted by heating the water bath to elevated temperatures, particularly if a salt is difficult to solubilize at room temperature. As such, many different physical mixtures of thermoplastic resin can be separated whether they are in the form of granular, pellet or ground up molded plastic parts. For example, the process of this invention can be employed to separate such physical mixtures as polyvinyl chloride—polyethylene, polycarbonate—polyethylene, polycarbonate—polybutylene terephthalate, and such other mixtures of different plastic materials the components of which have different densities. In fact, physical mixtures of different plastics may be separated by the process of this invention, such as a mixture of three or four different plastics. The separation of such multiplastics mixtures would probably require two or more separation steps. Obviously to obtain good separation and efficiency, it may be advisable to granulate molded plastic parts prior to the separation thereof.

The floatation bath or medium is prepared by dissolving sufficient salt of this invention in water to obtain the predetermined concentration for the desired density of the floatation bath for the separation of the physical mixture of materials. The recovery rate under this invention is generally very high and can exceed 90%.

The process of this invention lends itself to the separation of plastics from plastic resin mixtures in order that the separated plastic components can be recycled. The plastics that are recovered can then be melt blended with virgin thermoplastic resins or directly molded into plastic articles. Such directly molded articles may include, for example, outdoor benches, roofing, wood substitutes, business and electrical equipment, chairs, carts, auto parts, toys, etc.

The following provided Examples illustrate various embodiments of this invention and are for the purpose of illustration only. They should not be regarded as limiting this invention to any specific materials or conditions as employed therein.

EXAMPLE 1

This Example is set forth to demonstrate one embodiment of this invention wherein an automobile bumper system consisting of a thermoplastic molded facia adhered to a thermoplastic beam with an epoxy adhesive. In this Example, the epoxy adhesive is separated from the thermoplastic molded facia and beam. The fascia and beam are molded from a thermoplastic resin comprising a blend of an aromatic polycarbonate resin and a polybutylene terephthalate resin. The molded article, i.e. the bumper system consisting of the thermoplastic molded facia which is adhered to the thermoplastic beam with an epoxy adhesive, is ground up into particles of about 1/16" to about 1/2" in size. Grinding substantially breaks the molded thermoplastic parts from the epoxy adhesive such that the material after grinding is substantially a blend of epoxy adhesive particles and thermoplastic resin particles. Fines are removed from the ground material through air classification because fines present a larger surface area, making them difficult to wet in the floatation bath and would have a tendency to gum up in the floatation bath such that separation would be difficult. The thermoplastic resin in this Example has a specific gravity of about 1.2 g/cc, and the epoxy resin has a specific gravity of about 1.4 g/cc.

A floatation bath is prepared by dissolving sufficient sodium dihydrogen phosphate in a water bath at about room temperature to provide a floatation separation bath having a specific gravity of about 1.25 g/cc. The ground up material, less the fines, is then added to the floatation bath under slight agitation. The molded thermoplastic particles float to the surface of the bath and are removed by skimming from the surface. The particles are dried and subjected to paint removal by the process described in copending patent application Ser. No. 08/100392 (Docket RD22742) filed Aug. 2, 1993, and assigned to the same Assignee as the instant patent application. Copending patent application Ser. No. 08/100392 is incorporated herein by reference. Because of their greater specific gravity, the epoxy particles sink to the bottom of the floatation tank. These epoxy particles are then removed and discarded.

The recovered thermoplastic particles after paint removal are rinsed and dried. These pellets can then be extruded into sheets or profiles. Alternatively, the recycled pellets may be melt blended with virgin thermoplastic resin in whatever proportions desired. Also, depending on the end use application, the recycled pelletized material may also be molded into parts by injection or compression molding.

Since the floatation bath uses a sodium dihydrogen phosphate salt, any residual phosphate salt in the recovered thermoplastic resin particles will not cause a stability problem in the melt flow during melt processing of the recovered thermoplastic particles as per U.S. Pat. No. 4,532,290.

EXAMPLE 2

Example 1 was repeated except that the molded thermoplastic bumper was adhered to the molded thermoplastic beam with methylmethacrylate based adhesive and the floatation bath was prepared having a specific gravity of about 1.15 g/cc with the sodium dihydrogen phosphate. The specific gravity of the adhesive was about 1.0 g/cc. In this Example, the molded thermoplastic resin particles sank to the bottom of the floatation tank and was then removed from the tank. The adhesive particles floated to the surface because of their lighter specific gravity and were removed by skimming from the surface of the bath. The recovered molded thermoplastic particles were subjected to the same recovery and reuse as set forth in Example 1.

EXAMPLE 3

A mixture of particles of polyvinyl chloride and a thermoplastic resin comprising a blend of an aromatic polycarbonate and a polybutylene terephthalate were separated in a floatation bath prepared by dissolving sufficient tricalcium phosphate in water to provide a concentration bath having a specific gravity of about 1.3 g/cc. Any fines were removed from the mixture by the same procedure employed in Example 1. The mixture of resin particles, after removal of fines, was then added to the floatation bath. The polyvinyl chloride which has a specific gravity of about 1.4 g/cc sank to the bottom of the tank and the blended thermoplastic resin which has a specific gravity of about 1.2 g/cc floated to the top of the floatation bath. The materials were recovered separately, dried and separately pelletized by melt extrusion.

EXAMPLE 4

Example 3 was repeated except that a mixture of polyethylene and polybutylene terephthalate (PBT) were separated by employing a floatation bath having a specific gravity of about 1.05 g/cc by dissolving sufficient sodium hexametaphosphate in water. The polyethylene particles (specific gravity of less than about 1.00 g/cc) floated to the surface of the bath and the PBT particles (specific gravity of about 1.3 g/cc) sank to the bottom. The materials were separately recovered and processed as in Example 3.

EXAMPLE 5

A physical mixture of resin pellets of polycarbonate resin (specific gravity 1.2 g/cc) and polybutylene terephthalate (PBT) resin (specific gravity 1.3 g/cc) were separated by immersing the pellets in a floatation bath prepared by dissolving sufficient mono sodium phosphate to obtain a specific gravity of about 1.23 g/cc. Total weight/volume was used to measure density. The pH of the bath was 4.5. The pellets of polycarbonate floated to the top of the floatation vessel and the pellets of polybutylene terephthalate sank to the bottom. The materials were separately recovered, dried and stored for future molding thereof.

EXAMPLE 6

Example 5 was repeated except that a physical mixture of polycarbonate particles (specific gravity 1.2 g/cc) and amorphous polyethylene terephthalate particles (specific gravity 1.33 g/cc) were separated under the same conditions of Example 5.

EXAMPLE 7

Example 5 was repeated except that a physical mixture of acrylonitrile-butadiene-styrene (ABS) particles (specific gravity 1.02 g/cc) and PBT particles (specific gravity 1.3 g/cc) were separated under the same conditions of Example 5.

EXAMPLE 8

Example 5 was repeated except that a physical mixture of polypropylene particles (specific gravity 0.9 g/cc) and PBT particles (specific gravity 1.3 g/cc) were separated under the same conditions as Example 5.

EXAMPLE 9

Example 5 was repeated except that a physical mixture of polypropylene particles (specific gravity 0.9 g/cc) and PBT specific gravity 1.3 g/cc and PMMA specific gravity of 1.19 g/cc particles (specific gravity 1.3 g/cc) were separated under the same conditions as Example 5.

EXAMPLE 10

Example 5 was repeated except that a physical mixture of ABS particles (specific gravity 1.02 g/cc) and polycarbonate particles (specific gravity 1.2 g/cc) were separated in floatation baths having a density of 1.08 g/cc and a pH of 4.7.

EXAMPLE 11

Example 10 was repeated except that a physical mixture of ABS particles (specific gravity 1.02 g/cc) and polymethylmethacrylate particles (specific gravity 1.19 g/cc) were separated under the same conditions as in Example 10.

EXAMPLE 12

Example 5 was repeated with 5.5 grams of the monosodium phosphate to prepare a flotation bath having a specific gravity of about 1.08 g/cc and pH of 4.7. In this bath the following resins were float separated:

(i) polypropylene particles (spec. grav. 0.9 g/cc) and polycarbonate (spec. grav. 1.2 g/cc); and (ii) ABS (spec. grav. 1.02 g/cc) and PBT (spec. gray. 1.3 g/cc);

The particles were successfully separated recovered as in Example 5.

EXAMPLE 13

Example 5 was repeated except that a physical mixture of PBT particles (specific gravity 1.3 g/cc) and a 30 weight % glass fiber filled PBT particles (specific gravity 1.53 g/cc) were separated using a floatation bath having a density of 1.32 g/cc by dissolving sufficient sodium hexametaphosphate in water and having a pH 6.2. The glass filled PBT particles sank to the bottom of the vessel and the PBT particles floated to the surface.

EXAMPLE 14

Example 12 was repeated except the physical mixture of polycarbonate particles (specific gravity 1.2 g/cc) and 30 weight % glass fiber filled PBT particles (specific gravity 1.53 g/cc) were separated in a floatation bath by dissolving sufficient sodium hexametaphosphate in water to obtain a density of 1.32 g/cc and a pH of 6.2. The particles were recovered as in Example 3 namely the PC particles floated to the surface and the glass filled PBT particles sank to the bottom of the vessel.

EXAMPLE 15

Example 12 was repeated except the physical mixture of polycarbonate particles (specific gravity 1.2 g/cc) and 30 weight % glass fiber filled PBT particles (specific gravity 1.53 g/cc) were separated in a floatation bath by dissolving sufficient tetra potassium pyrophosphate in water to obtain a density of 1.42 g/cc and a pH of 10.6. The particles were recovered as in Example 12 namely the polycarbonate particles floated to the surface and the glass filled PBT particles sank to the bottom of the vessel.

EXAMPLE 16

Example 12 was repeated except the physical mixture of PBT particles (specific gravity 1.3 g/cc) and 30 weight % glass fiber filled PBT particles (specific gravity 1.53 g/cc) were separated in a flotation bath by dissolving sufficient disodium phosphate in water to obtain a density of 1.31 g/cc and a pH of 8.8. The particles were recovered as in Example 12; namely, the polycarbonate particles floated to the surface and the glass filled PBT particles sank to the bottom of the vessel.

While variations of this invention will be suggested to those skilled in the art, in view of the above disclosures, any such variations are intended to be within the scope of the claims appended hereto.

What is claimed is:

1. An improved process for separating at least one thermoplastic resin component from a physical mixture of materials including said thermoplastic resin component and comprising a plurality of components, each component having a different specific gravity, said process comprising dissolving an amount of a water soluble salt in an aqueous bath to obtain a specific gravity that is between the specific gravity of said one resin component to be separated and the remaining components of the physical mixture, said salt being added in to said aqueous bath in a sufficient amount to form an aqueous separation floatation bath having a specific gravity greater than about 1.0 gram per cubic centimeter, said salt being selected from the group consisting of alkali metal and alkaline earth metal salts of phosphates, pyrophosphates, metaphosphates, polyphosphates, hydrates thereof, and blends thereof contacting said physical mixture of material with said aqueous bath for one of either floating or sinking said one resin component and for the other of either floating or sinking said remaining components to separate said one resin component from said remaining components, and removing said one resin component from said aqueous bath.

2. The improved process of claim 1 wherein the pH of the floatation bath is about 3 to about 12.

3. The improved process of claim 1 wherein the pH of the floatation bath is about 4 to about 9.

4. The improved process of claim 1 wherein the pH of the floatation bath is about 4 to about 7.

5. The improved process of claim 1 wherein the physical mixture being separated is a thermoplastic resin mixture, the components of which have different specific gravity.

6. The improved process of claim 5 wherein the specific gravity of the aqueous floatation bath is about 1.05 to about 1.6 grams per cubic centimeter.

7. The improved process of claim 5 wherein the metal salt is selected from the group consisting of alkali metal salts of phosphates, pyrophosphates, metaphosphates, polyphosphates, hydrates thereof, and blends thereof.

8. The improved process of claim 5 wherein the metal salt is selected from the group consisting of alkaline earth metal salts of phosphates, pyrophosphates, metaphosphates, polyphosphates, hydrates thereof, and blends thereof.

9. The improved process of claim 7 wherein the phosphate metal salt is sodium dihydrogen phosphate.

10. The improved process of claim 7 wherein the pyrophosphate metal salt is sodium acid pyrophosphate.

11. The improved process of claim 7 wherein the metaphosphate metal salt is sodium hexametaphosphate.

12. The improved process of claim 5 wherein said thermoplastic resin mixture comprises a molded thermoplastic resin automobile bumper system comprising a molded thermoplastic resin facia adhered with an adhesive to a molded thermoplastic resin beam, wherein said improved process comprises the steps of grinding the bumper system into small particles, dissolving sufficient sodium dihydrogen phosphate in an aqueous separation floatation bath to a specific gravity of about 1.30 grams per cubic centimeter, immersing said particles in the floatation separation bath, and removing the molded thermoplastic resin parts from the surface of the floatation bath.

13. The improved process of claim 12 wherein the adhesive is an epoxy adhesive having a specific gravity of about 1.4 grams per cubic centimeter.

14. An improved process for separating at least one thermoplastic resin component from a physical mixture of materials including said thermoplastic resin component and comprising a plurality of components, each component having a different specific gravity, said process consisting essentially of dissolving an amount of a water soluble salt in an aqueous bath to obtain a specific gravity that is between the specific gravity of said one resin component to be separated and the remaining components of the physical mixture, said salt being added in to said aqueous bath in a sufficient amount to form an aqueous separation floatation bath having a specific gravity greater than about 1.0 gram per cubic centimeter, said salt being selected from the group consisting of alkali metal and alkaline earth metal salts of phosphates, pyrophosphates, metaphosphates, polyphosphates, hydrates thereof, and blends thereof, contacting said physical mixture of material with said aqueous bath for one of either floating or sinking said one resin component and for the other of either floating or sinking said remaining components to separate said one resin component from said remaining components, and removing said one resin component from said aqueous bath.

15. The improved process of claim 12, wherein said molded thermoplastic resin bumper is molded from a blend of an aromatic polycarbonate resin and a polyalkylene terephthalate resin.

16. The improved process of claim 5, wherein at least one of said thermoplastic resins is selected from polycarbonate, polyester, copolyestercarbonate, polyphenylene ether, polyimide, rubber modified monovinylidene aromatic resin, polyolefin, polyamide, polyphenylene sulfide, polysulfone, polyvinyl, chloride, or copolymers, blends or composites thereof.

17. The improved process of claim 16, wherein said at least one of said thermoplastic resins is selected from polycarbonate, polyester, polyphenylene ether, rubber modified monovinylidene aromatic resin, polyolefin, polyamide, polyvinyl chloride, or copolymers, blends or composites thereof.

18. The improved process of claim 5 wherein said thermoplastic resin mixture comprises a molded automobile dashboard system, wherein said improved process comprises the steps of grinding the dashboard system into small particles, dissolving sufficient sodium dihydrogen phosphate in an aqueous separation floatation bath to a specific gravity of greater than about 1.20 grams per cubic centimeter, immersing said particles in the floatation separation bath, and removing the molded thermoplastic resin parts from the surface of the floatation bath.

19. The improved process of claim 5, wherein the thermoplastic resin mixture comprises (i) a mineral or glass filled thermoplastic resin and (ii) an unfilled thermoplastic resin.

20. The improved process of claim 1, wherein said materials having different specific gravities comprise (i) mineral or glass filled thermoplastic or thermoset resins and (ii) unfilled thermoplastic or thermoset resins.

* * * * *